Inventor:
Henry E. Warren,
by Harry E. Dunham
His Attorney.

Patented Sept. 28, 1937

2,094,481

UNITED STATES PATENT OFFICE 2,094,481

AUXILIARY SUPPLY FOR ALTERNATING-CURRENT SYSTEMS

Henry E. Warren, Ashland, Mass., assignor to Warren Telechron Company, Ashland, Mass., a corporation of Massachusetts Application February 25, 1936, Serial No. 65,610

3 Claims. (Cl. 171—97)

My invention relates to an auxiliary supply for alternating-current systems, particularly systems requiring a limited amount of power, such as alternating-current clock systems, and its object is to provide a reliable, inexpensive source of regulated frequency alternating current and an automatic change-over relay system therefor, whereby the auxiliary source becomes substantially instantly available whenever the normal source of supply fails. The auxiliary source may receive its energy from a direct-current supply, such as a storage battery. In order to convert such direct-current supply into regulated frequency alternating current, I use a simple vibrating reed converter and a transformer. The relay system, which is responsive to the voltage of the normal source of alternating-current supply, serves not only to change the connections of the supplied system from one source to the other as the conditions demand but also serves to start and stop the vibrating reed converter and make the necessary changes in the direct-current connections associated therewith to prevent waste of direct-current energy when the regular alternating-current supply is available.

The features of my invention which are believed to be novel and patentable will be pointed out in the claims appended hereto. For a better understanding of my invention, reference is made in the following description to the accompanying drawing in which Fig. 1 shows the parts and circuit connections employed in carrying my invention into effect; and Fig. 2 shows the same general arrangement with a somewhat different relay contact arrangement.

Figure 1:
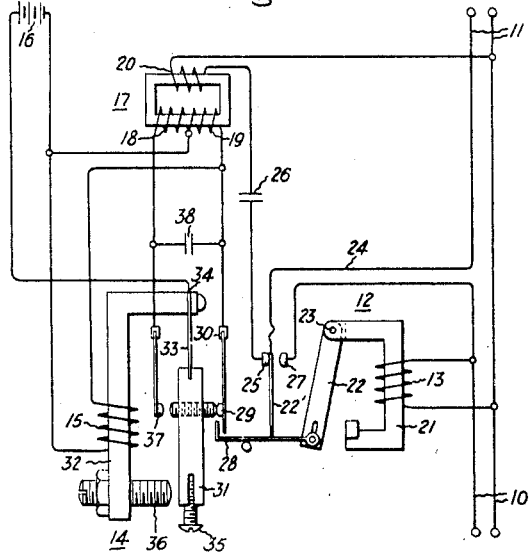
Figure 2:
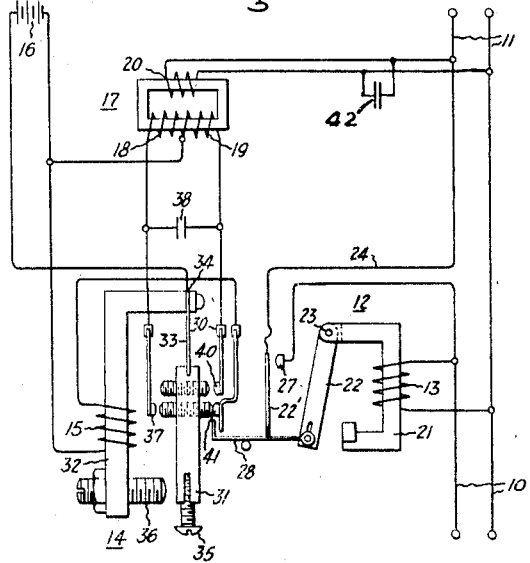

Referring to Fig. 1, 10 represents a normal source of alternating-current supply and 11 a system which is normally supplied thereby, such, for example, as a synchronous motor driven clock system. In case no auxiliary supply is available, the clocks or other devices connected to system 11 will stop should the supply 10 fail for any reason. Such failures are not likely to happen often or to be of long duration but it is, nevertheless, desirable to provide a reliable auxiliary source of supply which will become substantially instantly available to supply the clock system at the proper frequency to keep the clocks in operation without appreciable error so as to maintain correct time service in case of such a failure. Such auxiliary supply apparatus may not be called upon to function more than a few minutes during a year, consequently, it should be as low in cost as is possible.

To prevent waste of energy, the auxiliary apparatus should be normally de-energized, but should be of such character as to start into operation very quickly in response to a failure in the regular supply and to generate alternating current at the correct frequency and voltage for the clock system during the period of failure of the regular supply and then transfer control to the regular supply as soon as it is available and restore itself to the idle de-energized condition in readiness for the next emergency.

The auxiliary apparatus represented in Fig. 1 fulfills these requirements and its main parts comprise a contact relay 12 having its operating coil 13 connected to and responsive to the regular source of supply 10, a vibrating reed contact device 14 having its operating coil 15 supplied from an ordinary six-volt storage battery 16, and a transformer 17 having low-voltage primary winding coils 18 and 19 supplied by impulses from the storage battery 16 through the contacts of the vibrating reed device, and having its secondary winding 20 connected through contacts controlled by relay 12 of the clock system 11.

The relay 12 serves a double function, namely, to transfer the connection to the system 11 from the regular supply 10 to the transformer secondary 20 and vice versa, and to energize and de-energize the vibrating reed converter, both functions being responsive, respectively, to the failure and resumption of the regular supply 10, and by a failure I mean to include a drop in voltage of the regular source below that which will give satisfactory service.

Relay 12 comprises the stationary magnetic core 21 energized by the coil 13 and a movable magnetic armature 22 pivoted or resiliently supported at 23 for operating a contact member 22' connected to one side 24 of the system 11. Armature contact member 22', when in the de-energized position, is biased to rest against a stationary contact 25 connected through a condenser 26 to one terminal of the secondary winding 20 of the transformer 17. The other terminal of the transformer winding 20 is connected to that side of the line 11, which constitutes a permanent connection between one side of the regular supply system 10 and one side of the clock system 11. When the relay 12 is energized, its movable contact 22' moves away from contact 25 and rests against another stationary contact 27 which is connected to the other side of the regular supply 10. It will thus be seen that, when the supply 10 fails and relay 12 is de-energized, the clock system 11 is connected to the transformer winding 20 and disconnected from source 10. When the supply 10 is available, relay 12 is energized and system 11 is connected to supply 10 and disconnected from the transformer.

The armature 22 of the transfer relay 12 also operates a hooked extension 28 which co-operates with one of the contacts 29 of the vibrating reed device 14. Contact 29 is resiliently supported at 30 and, when released by the hook 28, assumes a position where it will contact with the movable armature member 31 of the vibrating reed when the latter is in its neutral or idle position. When, however, relay 12 is energized, the hook 28 withdraws contact 29 so that it is out of reach of the armature 31, even should the latter be vibrating. With the connections to be explained, it will appear that this feature serves respectively to energize and de-energize the vibrating reed device in response to a failure and resumption of the regular source of supply 10.

The vibrating reed device consists of a U-shaped stationary magnetic core 32 on which the energizing coil 15 is wound. The reed 33 is secured at its upper end 34 to the upper extremity of the core 32. The reed 33 is of resilient magnetic material and carries the magnetic contact-making armature 31 at its lower end adjacent to the lower limb of the core 32. The period of vibration of the reed 33 and armature 31 is made to correspond to the normal frequency of the clock system 11 and the vibrating member preferably carries an adjusting screw 35 to make this frequency of vibration exactly correct. The amplitude of vibration of armature 31 is also preferably made adjustable by making the lower limb of the magnet core 32 in the form of an adjustment screw 36, serving as a stop between the lower extremity of the core piece 32 and armature 31. The tip of this magnetic screw 36 may be faced with nonmagnetic material, if desired.

On the opposite side of armature 31 from contact 29 previously referred to, there is another relatively stationary contact 37 which is resiliently supported by a stationary part of the structure, not shown in detail. The contacts 29 and 37 or the co-operating contacts on armature 31 will preferably be adjustable to adjust for best conditions. It will be understood that, when the armature vibrates, contact is alternately made and broken with contacts 29 and 37 if the transfer relay 12 is de-energized and that, in the idle or rest position of the armature 31, it will rest lightly against contact 29 when the transfer relay 12 is de-energized. In case relay 12 is energized, contact 29 is withdrawn far enough so that the armature 31 does not make contact therewith even if vibrating.

The coil 15 of the vibrating reed device is connected, as shown, so as to be energized from the storage battery 16 through the reed 33 and contact 29 when the latter is in contact with armature 31. The primary coil 19 of the transformer is connected, as shown, to be energized in parallel with coil 15 when the contact at 29 closes. The other primary coil 18 of the transformer is connected, as shown, to be energized from the storage battery 16 when the vibrating reed armature 31 makes contact at 37. Coils 18 and 19 may be considered as a single winding which has a middle tap permanently connected to one side of storage battery 16. The other side of the battery is permanently connected to the vibrating reed 33. The alternate impulses flowing through coils 18 and 19 produce fluxes in the transformer core which are in opposite directions.

A condenser 38 is preferably connected across the contacts 29 and 37. The resiliency of the supports of these contacts tends to prolong the duration of contact slightly. The condenser 38 and the condenser 26 in the secondary of the transformer tend to smooth out the current and flux impulses so that a satisfactory alternating-current wave is supplied to the clock system 11 when the auxiliary apparatus is in operation. In the arrangement described, a complete oscillation or back and forth movement of the vibrating armature 31 corresponds to a complete cycle of alternating current as produced at the secondary terminals of the transformer. The invention is not confined to this relationship, however. The relation of turns in primary and secondary will be such as to produce the proper operating voltage for system 11.

Operation

When the regular alternating-current supply is available at 10, relay 12 will be energized. Its armature contact will be closed on contact 27, connecting the system 11 to the source 10. Transformer winding 20 will be disconnected at contact 25. Contact 29 of the vibratory device 14 will be withdrawn to the right by relay 12, and hence the winding 15 of this device will receive no energy. Armature 31 will be at rest with both contacts 29 and 37 open so that no current is drawn from the storage battery 16 when the apparatus is in this condition and all windings of the transformer are de-energized.

Let us assume now that the power supply at 10 fails. This de-energizes relay 12, its armature swings to the left and the following circuit changes occur simultaneously. Contact between 22' and 27 is broken, disconnecting system 11 from source 10. Contact is made between 22' and 25 connecting the secondary winding 20 of transformer 17 to system 11. Contact 29 is released and moves into contact with armature contact 31 of the vibrating device, thereby energizing coil 15 and, at the same time, sending a current pulsation through primary coil 19 of transformer 17 which appears at the terminals of the secondary winding as the first half cycle of the auxiliary alternating-current supply. Armature 31 meanwhile is drawn to the left by the magnetic pulsation in core 32, opening contact at 29 and closing contact at 37. This de-energizes coil 19 of the transformer and coil 15 of the vibrating relay and energizes coil 18 of the transformer, sending a current pulsation therethrough which is reflected at the terminals of the secondary winding 20 as the next and reverse half cycle of the auxiliary supply. Armature 31 springs away to the right, opening contact at 37 and closing contact at 29 and continues in vibration, repeating the cycle of operation just described at a rate which is adjusted to produce correct frequency alternating-current for the clock system 11. The transformer ratio is, of course, such that normal voltage is also available on system 11.

It will be evident that the auxiliary supply becomes available at correct voltage and frequency practically instantaneously following a failure of the regular supply. The installation is relatively inexpensive and there is no drain on the storage battery 16 except when the auxiliary supply is in use and then its energy is efficiently used. The resilient support of the various contacts assures a slight wiping contact action which is desirable and the slight shock of the vibrating relay device is beneficial in case dust has collected and the parts tend to stick due to the normally idle condition.

When the regular supply at 10 is resumed, relay 12 is energized, opening contact at 25 and closing contact at 27, connecting system 11 to source 10, and disconnecting the transformer. Contact 29 is pulled away so as to prevent contact between it and armature 31, which then stops vibrating, leaving all circuits supplied by battery 16 open. This change-over is also accomplished without loss of time. An occasional inspection of the apparatus and recharging of battery 16, if a battery is used, is all the attention which the apparatus should require.

In Fig. 2, the parts of the apparatus which are similar to Fig. 1 are indicated by like reference characters and should need no further explanation. The contact corresponding to 29 of Fig. 1 has been separated into two contacts 40 and 41 in Fig. 2. Contact 40 is resiliently supported and is connected to supply transformer coil 19. Contact 41 is resiliently supported and is connected to supply coil 15 of the vibrating relay device. These contacts may now be independently adjusted to positions best suited for their different functions. The time and duration of energizing the operating coil 15 for the vibrating relay can be changed without disturbing the position of contact 40 and likewise the duration of the pulsation of transformer energization through contact 40 may be changed without disturbing contact 41. Contact 41 is withdrawn by relay 12 when the latter is energized to stop operation of the vibrator as in Fig. 1.

In Fig. 2, the secondary winding 20 may be connected and controlled the same as in Fig. 1, but a slightly different arrangement is shown. Transformer 17 is permanently connected to the system 11 in parallel with condenser 42 and the contact 25 of relay 13 (Fig. 1) is omitted. Very little energy is fed back through the transformer to condenser 38 under normal conditions when the source 10 is available with this arrangement because with condensers present the arrangement constitutes a tuned circuit. Both the arrangements of Figs. 1 and 2 have been found to be satisfactory. The separation of the contacts 40 and 41 in Fig. 2 offers some slight advantage in adjustment.

Although the invention has been described as an auxiliary supply for a clock system, it may be used as an auxiliary supply for other purposes, such, for example, as signalling systems where a regulated frequency is used and service interruptions are to be avoided.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. An auxiliary source of alternating-current supply comprising a transformer having primary and secondary windings, a direct-current source of supply therefor, a vibrating reed contactor interposed between said direct-current source and the primary winding of said transformer in such manner that, when the vibrating reed contactor is in operation, an alternating current of a desired voltage and frequency may be supplied from the secondary winding of said transformer, an electromagnet for operating said vibrating reed contactor, and a circuit for energizing said electromagnet from said direct-current source through said contactor, said energizing circuit including a resiliently mounted contact which is movable towards and away from the vibratory element of said contactor inclusive of positions where contact is made when the vibratory element of the contactor is idle and at one extremity of its swing when it is vibrating, and where no contact is made under either condition.

2. In combination with a regular source of alternating-current supply and a load circuit supplied thereby, an auxiliary source for supplying said load circuit when the regular source fails comprising a direct-current supply, a vibrating reed contact device and a transformer having primary and secondary windings, connections for supplying the primary of said transformer by impulses from the direct-current supply through the vibrating reed contact device such that alternating current of the desired frequency may be supplied from the secondary winding of said transformer only when the vibrating reed device is in operation, said vibrating reed device having a vibratory contact and a pair of relatively stationary contacts between which the vibratory contact oscillates when in operation and through which the impulses to said transformer are supplied, an electromagnet for operating said vibratory contact device, which electromagnet is energized through the vibratory contact and one of the relatively stationary contacts, and relay means responsive to the voltage of the regular alternating-current supply for shifting the position of the relatively stationary contact through which the electromagnet is supplied so that the electromagnet will be energized in the idle position of said vibratory contact when the regular source fails and will be intermittently energized as long as such failure persists when the vibratory reed is in operation, and will cease to be energized for all conditions of said vibratory contact when the regular source of supply is resumed.

3. In combination with a regular source of alternating-current supply, a load circuit normally supplied thereby, and an auxiliary source for supplying said load circuit at the desired frequency during failures of the regular source, said auxiliary source comprising a direct-current supply, a transformer having primary and secondary windings and a vibratory contact device for supplying alternate reversed current impulses from said direct-current source to the primary winding of said transformer such that alternating current of the desired frequency may be supplied to said load circuit from the secondary winding of said transformer, said vibratory contact device comprising a pair of resiliently mounted relatively stationary contacts and a vibrating contact which oscillates between and alternately makes contact with the relatively stationary contact and which has an intermediate out-of-contact position of rest, an electromagnet for oscillating said vibratory contact, a circuit for energizing said electromagnet from said direct-current source including said vibratory contact and a third relatively stationary contact, the latter being movable to and from contacting position with said vibratory contact both when the latter is at rest and when in vibration, and relay means responsive to the voltage of said regular source of alternating-current supply for positioning said third contact such that it makes contact with the vibratory contact when the latter is at rest when the regular supply source fails, intermittently makes contact with the vibratory contact when the latter is vibrating so long as said failure continues, and ceases to make contact with the vibratory contact in any condition when the regular source of supply is resumed.

HENRY E. WARREN.